(12) United States Patent
Gunawardena et al.

(10) Patent No.: US 12,052,998 B1
(45) Date of Patent: Aug. 6, 2024

(54) STEAM PASTEURIZATION SYSTEM AND METHOD

(71) Applicant: John Bean Technologies Corporation, Chicago, IL (US)

(72) Inventors: Ramesh M. Gunawardena, Solon, OH (US); Owen Eugene Morey, Huron, OH (US)

(73) Assignee: John Bean Technologies Corporation, Chicago, IL (US)

( * ) Notice: Subject to any disclaimer, the term of this patent is extended or adjusted under 35 U.S.C. 154(b) by 372 days.

(21) Appl. No.: 17/587,471

(22) Filed: Jan. 28, 2022

Related U.S. Application Data

(63) Continuation of application No. 15/139,207, filed on Apr. 26, 2016, now Pat. No. 11,234,444.

(51) Int. Cl.
| | |
|---|---|
| A61L 2/08 | (2006.01) |
| A23B 4/005 | (2006.01) |
| A23C 3/00 | (2006.01) |
| A23L 3/00 | (2006.01) |
| A23L 3/16 | (2006.01) |
| A23L 3/18 | (2006.01) |

(52) U.S. Cl.
CPC ............ *A23B 4/0053* (2013.01); *A23L 3/003* (2013.01); *A23L 3/185* (2013.01); *A23V 2002/00* (2013.01)

(58) Field of Classification Search
CPC ... B30B 15/288; F16F 2230/24; F16F 9/0218; A23B 4/00; A23B 4/005; A23B 4/0053; A23V 2002/00; B65B 55/12; A61L 2/07
USPC ............ 422/26; 426/210–511, 520–521, 524
See application file for complete search history.

(56) References Cited

U.S. PATENT DOCUMENTS

| | | | | |
|---|---|---|---|---|
| 5,189,948 | A | * | 3/1993 | Liebermann ............... A23L 5/13 134/131 |
| 5,283,072 | A | * | 2/1994 | Cox ......................... A23B 5/12 426/313 |
| 5,472,725 | A | * | 12/1995 | Mendenhall ........... A23B 4/015 426/524 |
| 5,551,251 | A | | 9/1996 | Ochs et al. |
| 5,711,981 | A | | 1/1998 | Wilson et al. |
| 5,960,703 | A | | 10/1999 | Jara et al. |
| 6,410,066 | B1 | | 6/2002 | Weng |
| 2003/0049356 | A1 | * | 3/2003 | Nielsen ..................... A23L 3/20 426/522 |

(Continued)

*Primary Examiner* — Monzer R Chorbaji
(74) *Attorney, Agent, or Firm* — Christensen O'Connor Johnson Kindness PLLC

(57) ABSTRACT

The continuous pasteurization system (100) that pasteurizes raw food products (104) while substantially maintaining the raw state of the raw food products includes a conveyor (102) on which the raw food products (104) are loaded for delivery to a pasteurization apparatus 36, wherein the raw food products are quickly heated so that the temperature of the outer surface of the raw food products is raised sufficiently to achieve a desired pathogen kill level. Thereafter, the raw food products (104) are immediately cooled in a cooling apparatus (110) to remove the heat applied to the raw food product and maintain the substantial raw state of the raw food product. A control system (24) is connected to a processor (30) as well as various measuring devices and instruments, including temperature measurement devices ($T_1$-$T_5$) to control the operation of the pasteurization system (100).

10 Claims, 8 Drawing Sheets
(4 of 8 Drawing Sheet(s) Filed in Color)

(56) References Cited

U.S. PATENT DOCUMENTS

| | | | |
|---|---|---|---|
| 2005/0103213 A1* | 5/2005 | Dumm | A23C 3/031 |
| | | | 99/483 |
| 2006/0040029 A1 | 2/2006 | Gunawardena et al. | |
| 2008/0248168 A1* | 10/2008 | Black | A21D 13/31 |
| | | | 426/243 |
| 2011/0183058 A1* | 7/2011 | Fujiwara | A61L 2/07 |
| | | | 426/511 |

* cited by examiner

PROCESS: RAW

PROCESS-A1: STEAM 10 SECONDS

PROCESS A2: STEAM 10 SECONDS/CHILL 15 SECONDS

PROCESS B1: STEAM 20

*PROCESS B2: STEAM 20 SECONDS/CHILL 25 SECONDS*

*PROCESS C1: STEAM 30*

PROCESS C2: STEAM 30 SECONDS/CHILL 25 SECONDS

STEAM PASTEURIZATION SYSTEM AND METHOD

CROSS-REFERENCE TO RELATED APPLICATION

This application is a continuation of U.S. patent application Ser. No. 15/139,207, filed Apr. 26, 2016 (now U.S. patent Ser. No. 11/234,444), the entire contents of which are incorporated herein by reference.

BACKGROUND

The maximum acceptable levels of bacteria on raw food products, including vegetables, fruits, meat and poultry, have been set by the Food Safety Modernization Act (the "Act") and the subsequent FDA regulations issued under the Act. The Act also calls for increased verification and validation that the raw food products being sold actually meet the bacteria limit standards. The United States Department of Agriculture (the "USDA") estimates that up to 25% of raw poultry products sold to consumers are contaminated with *salmonella*. The USDA also estimates that 65% of processing plants are presently out of compliance with bacteria limit standards.

One methodology that has been proposed to address the new requirements for the reduction in level of raw food contamination employs chemical processes. One such process uses the chemical silver dihydrogen citrate. Use of this chemical for addressing raw food contamination is currently being reviewed by the USDA.

The methods and systems of the present disclosure seek to achieve reduced levels of bacterial contamination on raw food products utilizing a non-chemical process and system. The present disclosure seeks to treat raw food products with one or more short duration cycles of high temperature exposure followed immediately by extremely low temperature exposure, thereby sufficiently heating the exterior of the raw food products to reduce the level of bacteria thereon, but without appreciably changing the raw state of the food product.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method is provided for continuously pasteurizing raw food products to kill a desired percentage of pathogens located on and/or in the raw food product without appreciably changing the raw state of the raw food products. The method includes a pasteurization step, wherein the raw food products are exposed to a pasteurization zone having a temperature setting of at least 190° F. for a sufficiently short duration so as to not substantially change the raw state of the food products. Such duration typically will be for a maximum time period of about 30 seconds. In a subsequent cooling step, the heated, raw food product is immediately exposed to a low temperature zone to rapidly remove condensed moisture on the surface of the raw food product, as well as rapidly remove the heat energy applied to the raw food products during the pasteurization/heating step, thereby to avoid appreciably changing the raw state of the raw food products. Optionally, or if needed, the pasteurization step and the cooling step can be repeated one or more times to achieve a desired pathogen kill percentage while substantially maintaining the raw state of the raw food products.

The raw state of the raw food products can be determined by one or more parameters selected from the group consisting of: the color of the exterior of the raw food product, the denaturing of the protein of the raw food product, and the rendering of the fat of the raw food product.

The method may further include measuring the temperature of the raw food products, before, during and/or after the pasteurization cycle, to determine if a further pasteurization cycle is needed to achieve a desired pathogen kill percentage, and also to determine the parameters of the one or more further pasteurization cycles. In repeating the pasteurization cycle, the raw food products may be exposed to the heating medium for a maximum time duration that differs from the exposure of the raw food products to the heating medium during the prior heating cycle. Correspondingly, in repeating the pasteurization cycle, the raw food products may be subjected to the cooling medium for a maximum time duration that differs from the time duration of the exposure of the raw food products to the cooling medium in the prior pasteurization cycle.

In the pasteurization step, the raw food product is exposed to saturated steam at temperatures selected from the group comprising: about 90° F. to 212° F.; about 200° F. to 212° F.; and over 200° F. Moreover, the raw food product can be exposed to different temperatures during the pasteurization step, for example, the raw food product may be exposed to a first temperature zone of at least 190° F., then a second temperature zone of at least 200° F., and then a third temperature zone of at least 90° F.

In the pasteurization step, the raw food product is exposed to pasteurization zone for a maximum time period selected from the maximum time periods of about 30 seconds, about 25 seconds, about 20 seconds, and about 15 seconds. Further, saturated steam is supplied to the pasteurization zone at a pressure range of about 5 to 20 psig.

In the cooling step, high velocity impingement air is directed to the raw food products at a temperature range of about −20 to −60° F. As an alternative, the raw food products may be exposed to cryogenic freezing. Further, the impingement air may be directed at the raw food products at a velocity of about 500 feet per minute to 3,500 feet per minute. The raw food product may be exposed to the high velocity impingement cooling air or to the cryogenic freezer for a maximum time duration selected from the time periods of about 30 seconds, 25 seconds, 20 seconds, and 15 seconds.

The present method may also comprise:
  ascertaining the physical parameters of the raw food products prior to entry into the pasteurization zone to predetermine a pasteurization and cooling cycle for the raw food products;
  exposing the raw food products to the pasteurization zone at predetermined set point parameters for a predetermined time period based on the ascertained physical parameters of the raw food products; and
  thereafter immediately exposing the raw food products to a cooling zone at predetermined set point parameters for a predetermined time length based on the ascertained physical parameters of the raw food products, thereby to rapidly remove the heat energy gained by the raw food products in the pasteurization zone.

The ascertained physical parameters of the raw food products may include one or more parameters selected from the group consisting of: the type of raw food products; the core temperature of the raw food product; the surface temperature of the raw food product; the water activity in the raw food product; the moisture level on the outer surface of the raw food products; and the color of the exterior of the raw food products.

The present disclosure also includes a system for continuously pasteurizing raw food products to kill a desired percentage of pathogens located on or near the surface of the food products while substantially maintaining the raw state of the raw food products. The system comprises:

a conveyance system for conveying the raw food products through the pasteurization system;

a pasteurization apparatus comprising a pasteurization chamber within which is created an elevated temperature sufficient to kill pathogens on or near the surface of the raw food products by at least 1 LOG within at least 30 seconds;

a cooling apparatus for receiving the heated raw food products from the pasteurization apparatus, the cooling apparatus comprising a cooling chamber within which is created a cooling environment rapidly cooling the raw food product to remove the heat energy applied to the raw food products during their heating process, and thereby maintaining the substantially raw state of the raw food product;

a temperature measuring system for measuring the temperature of the raw food products at one or more locations along the pasteurization system selected from the group consisting of: prior to entrance into the pasteurization chamber; within the pasteurization chamber; within the cooling chamber; after exiting the cooling chamber, the temperature measuring system also measuring the temperature within the pasteurization chamber and optionally within the cooling chamber; and a control system for receiving the temperature measurements from the temperature measuring system and controlling the speed of the conveyance system as well as the parameters of the pasteurization apparatus and cooling apparatus to achieve a desired elevated temperature on the exterior of the raw food products within the pasteurization chamber within at least 30 seconds, and then immediately cooling the exterior of the raw food product in the cooling chamber within a sufficiently short period of time without appreciably changing the raw state of the raw food product.

In the pasteurization system, saturated steam is supplied to the pasteurization chamber. Also, the cooling apparatus is configured to direct impingement air at a temperature of about −20 to −60° F. at the raw food product at a velocity of from about 500 to about 3,500 feet per minute.

DESCRIPTION OF THE DRAWINGS

The patent or application file contains at least one drawing/photograph executed in color. Copies of this patent or patent application publication with color drawing(s) will be provided by the Office upon request and payment of the necessary fee.

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
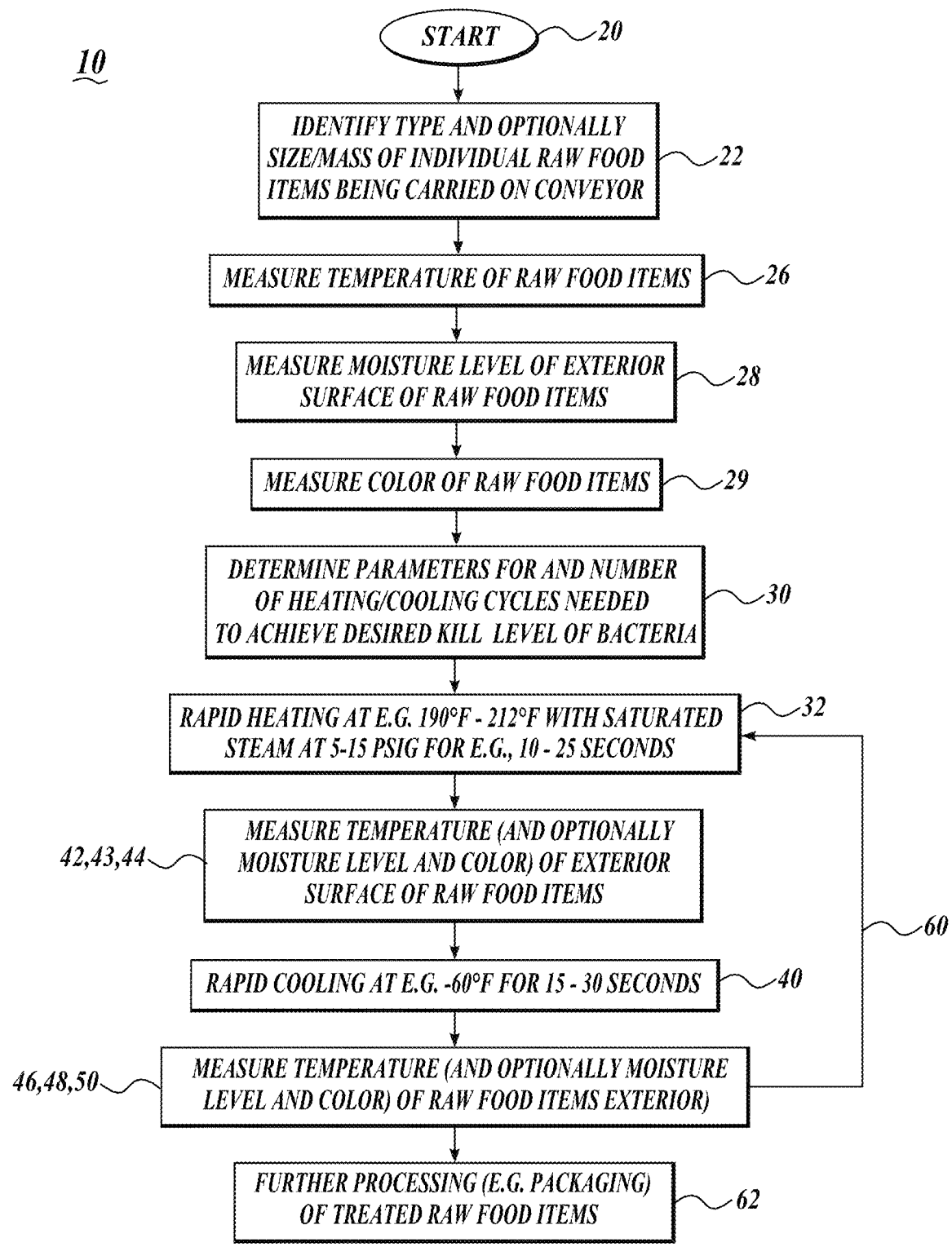
FIG. 1 is a flow diagram illustrating one embodiment of the method of the present disclosure.

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "top," "bottom," "right hand," "left hand," "in," "out," "extended," "advanced," "retracted," "proximal," and "distal." These references and other similar references in the present application are only to assist in helping describe and understand the present invention and are not intended to limit the present invention to these directions.

The present application may include modifiers such as the words "generally," "approximately," "about", or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out.

In the following description, various embodiments of the present disclosure are described. In the following description and in the accompanying drawings, the corresponding systems assemblies, apparatus and units may be identified by the same part number, but with an alpha suffix. The descriptions of the parts/components of such systems assemblies, apparatus, and units that are the same or similar are not repeated so as to avoid redundancy in the present application.

In the present application and claims, references to food products are meant to include all manner of food products. Such food products may include meat, fish, poultry, fruits, vegetables, nuts, or other types of foods. Also, the present systems and methods are specifically directed to raw food items/food products and specifically reducing pathogens on the exterior or closely below the exterior of the raw food product/item. The references to "food product(s)/item(s)" in the present application and claims is meant to refer to raw (or substantially raw) food product(s) or item(s) unless otherwise specified.

The present application and claims relate to killing or eliminating pathogenic microorganisms that may be present on and/or in food products. The application also describes the killing of "bacteria" in and/or on food products. Such references to bacteria and pathogenic microorganisms relate to food pathogens, including, among others, the following: *E. coli, Salmonella* spp., *Clostridium botulinum, Staphylococcus aureus, Campylobacter jejuni, Yersinia enterocolitica* and *Yersinia pseudotuberculosis, Listeria monocytogenes, Vibrio cholerae* O1, *Vibrio cholerae* non-O1, *Vibrio parahaemolyticus* and other vibrios, *Vibrio vulnificus, Clostridium perfringens, Bacillus cereus, Aeromonas hydrophila* and other spp., *Plesiomonas shigelloides, Shigella* spp., miscellaneous enterics, and *Streptococcus*.

Referring to FIG. 1, one embodiment of the process of the present disclosure is illustrated. In FIG. 1, the process starts at step 20. Next, in the first substantive step 22, if the nature or type of the raw food product or item is not known, it is ascertained visually or otherwise. Also, at step 22, optionally the size or mass and other physical characteristics of the individual raw food items is ascertained, for example, by optically scanning. This information can be sent to a control system 24 shown in FIG. 3. Thereafter, in step 26, the exterior and optionally the interior, temperature(s) of the raw food items is measured. The temperature measurement can be conducted by various non-invasive systems, for example, using an infrared temperature measurement apparatus. Thereafter, in step 28, the moisture level of the exterior surface of the raw food items is measured.

The moisture level of the exterior of the raw food product can be ascertained using an optical moisture meter or similar device. In step 29 the color of the exterior of the raw food product can be measured using a color meter. For poultry or other food items having a skin, the color of the skin can be measured and/or the color of the surface below the skin. The color measurement step is described more fully below.

Next, in step 30, the controller and its associated processor 31, the information previously ascertained, including the physical parameters of the food items, the temperature of the exterior (also optionally the interior) of the food items, the moisture level of the exterior of the raw food items, and the color of the raw food items, the processor 31, is employed to determine the parameters for the heating and cooling cycles to be applied to the raw food items to achieve the desired kill level of pathogens or bacteria.

Using the parameters determined in step 30, in step 32 the raw food item is rapidly heated for a short duration, for example, from about 10 to about 15 seconds or 20 seconds or 25 seconds, depending on various factors, including the initial temperature of the raw food item, the level of moisture on the exterior of the raw food item, the type of the raw food item, and the desired kill level of the bacteria on the exterior of the raw food item. The heating and pasteurization of the raw food item can be carried out using different media, for example, hot air or steam. The pasteurization medium can be applied to the raw food item in a pasteurization chamber, for example, pasteurization chamber 34 of pasteurization apparatus 36 shown in FIGS. 2, 3 and 4 described below.

If heated air is used as the pasteurization medium, such heated air is typically delivered to and circulated through the pasteurization chamber via hot air pumps or blowers. The air supplied by the blowers can be heated in numerous ways, for example, using electric, gas-fired heat, air heaters, or by heating the air with a heat exchanger using steam or other heating medium. The system for heating the air can be integrated into the construction of the blower or can be separate from the blower. A commercially available combined blower and gas heater assembly that may be used in the present disclosure is the Tube-O-Therm gas burner from Maxon Corporation of Muncie, Indiana. from the blower can be distributed in the pasteurization chamber by the use of manifolds having discharge openings or nozzles that are positioned to discharge the hot air over the exterior of the raw food product at a rate of about 500-2000 feet per minute.

If heated air is used as a pasteurization medium, it is desirable to add moisture to the pasteurization atmosphere to achieve the high humidity level therein. This serves various functions, including reducing the moisture loss from the raw food product. Also, the moisture level within the pasteurization chamber can be such that at least the initial temperature of the surface of the food products entering the pasteurization chamber would be lower than the dew point of the moist, hot air in the pasteurization chamber. This will cause the steam in the air to condense on the surface of the raw food product with the resulting heat of condensation being transmitted to the surface of the food product. By maintaining a sufficiently high temperature and humidity of the air within the pasteurization chamber, the heat of condensation can quickly increase the temperature of the exterior of the raw food product, thereby to achieve a desired kill rate for the pathogenic microorganisms or other contaminants that may be present on the exterior or near the exterior or slightly below the exterior of the food product.

Humidity also reduces surface evaporation and the heat that evaporation removes from the raw food product during heating. If a sufficiently high relative humidity surrounding the food product is not maintained during heating, undesirable evaporation cooling at the surface of the food product can occur.

Rather than adding water or steam or otherwise hydrating the air within a pasteurization chamber, the pasteurization medium can instead consist of steam. The steam may be from various sources, for example, a steam generator. The steam can be supplied to the pasteurization chamber at various temperatures, but preferably about at least 190° F. The steam can be supplied to the pasteurization chamber at a temperature of at least 200° F., for example, from about 200° to 212° F. For maximum heat transfer rate, the steam provided can be substantially fully saturated, and also somewhat super-heated. Further, the steam can be supplied to the pasteurization chamber at a pressure range of about 5 to psig. Subjecting the food product to saturated steam at low pressure helps expose the food product to a uniform and consistent steam vapor environment and provides for rapid energy transfer to the surfaces of the food product within the pasteurization chamber.

Steam supplied within the foregoing parameters assists in heating the exterior of the raw food product as quickly as possible to achieve a desired kill level of the pathogens thereon, without appreciably changing the color of the exterior of the raw food product, without rendering the fat on the exterior of the food product, or denaturing the protein of the exterior of the food product. As noted above, the exterior of the raw food product can be heated to a sufficiently high temperature to achieve a desired pathogen kill level, for example, at least a 1 LOG reduction, within a very short time, for example as short as about seconds, or even 25 seconds, or even 20 seconds, or even 15 seconds, or even seconds.

Immediately after completion of the heating/pasteurization step 32, the food product is introduced to an extremely low temperature environment at step 40. Such environment may consist of subjecting the food product to low temperature, high velocity impingement air. This results in evaporative cooling of the exterior of the food product back down to the original product surface temperature or even somewhat lower. This rapid removal of energy from the surface of the raw food product prevents the heat energy delivered to the raw food product surface during the pasteurization from conducting through or into the raw food product to change the exterior color of the raw food product or to denature proteins beneath the surface of the raw food product. Such rapid removal of the heat energy also prevents the rendering of fat that may be located at or near the surface of the raw food product. As such, the raw state of the food product does not appreciably change, even though the surface of the raw food product has been sufficiently heated to kill a desired level of pathogens thereon, i.e., at least a 1 LOG reduction.

The temperature of the cooling impingement air can be in the range of about −20° F. to −60° F. Moreover, the impingement air can be directed to or at the exterior of the food product at a velocity of from about 500 feet per minute to about 3500 feet per minute. The speed of the cooling air can depend on various factors, including, for example, the temperature of the cooling air, the temperature of the heated food product, the size and shape and thickness of the food product. Often but not always, the colder the cooling air, the less speed is required for the impinging air. Under these conditions, the exterior of the raw food product may be returned to its original temperature or even below in a very short period of time; for example, within about 30 seconds or within about 25 seconds, or within about 20 seconds, or even within about 15 seconds.

As an alternative to cooling the heated food product, utilizing cold high speed impingement air, the cryogenic freezer may be employed. Such freezers are articles of commerce. The food product is subjected to the environment of the cryogenic freezer for very short periods of time, typically in the range of about 30 seconds to 15 seconds. Dwell times with cryogenic freezing would be within this range or perhaps even for a shorter duration.

As shown in FIG. 1, at the end of the heating/pasteurization step, the surface temperature of the heated raw food product may be measured as well as optionally the moisture level of the exterior of the heated raw food product, and the color of the exterior of the raw food products as steps 42, 43 and 44, respectively. The temperature measurement will relate the level to which the pathogens have been killed on the exterior, or just below the exterior, of the raw food product. This will help determine whether or not a further pasteurization/cooling cycle is required to achieve the desired kill level of the pathogens. The measured temperature will also be used by the processor 18 in calculating the required pasteurization/heating duration during the second pasteurization/cooling cycle.

The temperature of the raw food product may also be measured at the end of the cooling process 40. This temperature measuring step is identified as 46 in FIG. 1. Also, optionally the moisture level of the exterior of the cooled raw food product may be measured at step 48 using, as noted above, an optical moisture reading apparatus. Also optionally, the exterior color of the cooled raw food product may be measured as step 50. The temperature and color measurements at steps 46 and 50 help to verify that the exterior temperature of the raw food product has been lowered to its original temperature or even below.

In FIG. 1, the step identified by arrow 60 signifies or represents treating the raw food product with a further heating/cooling cycle. As noted above, the duration of the heating/cooling cycle is calculated by the processor 31 based on the extent to which the raw food product was successfully treated against exterior pathogens, or near exterior pathogens, during the first heating/cooling cycle. In the second heating cycle, the maximum time duration that the raw food product is exposed to the saturated steam may differ from the time periods utilized in the first pasteurization/cooling cycle. Correspondingly, the time period that the heated raw food product is subjected to cooling will depend upon the time period of the second heating step. Thus, the time period for the second cooling step may differ from the time period of the first cooling step.

Once the desired kill level of the pathogens on the exterior (or near exterior) of the food product has been achieved utilizing the pasteurization/cooling cycle(s) shown in FIG. 1, thereafter the food product can proceed to further processing at step 62, for example, eviscerating, cutting, portioning, packaging and then refrigeration or other processing steps.

Prior to the use of the above process on a particular type of food product, validation studies can be performed to confirm different kill levels of pathogens achieved depending on the exterior temperature of the raw food product at the end of the pasteurization/heating step 32 described above. In this regard, samples of the raw food product are tested for a level of surface pathogens found thereon prior to any heating of the raw food product. Thereafter, the raw food product is heated utilizing the pasteurization apparatus 36 noted above and described below. Such heating may be for various periods of time, for example, seconds, 20 seconds, 30 seconds, etc. The heated samples are then immediately subjected to cooling using a freezing apparatus 110 noted above and described more fully below. For example, if the food product is heated for 10 seconds, the cooling may occur to 15 seconds. As another example, if the heating occurs for 20 seconds, the cooling may occur for 20 seconds. As a further example, if the heating occurs for 30 seconds, a cooling may occur for 25 seconds or perhaps 30 seconds.

Microbiological studies are conducted to determine the raw food product pathogen count. This base raw food product count is then compared with samples of the heated food products that are not cooled as well as on the samples of the food products that are both heated and then cooled. The studies will ascertain the level of pathogen kill achieved during, or as a result of, the rapid heating and cooling process. The foregoing tests will be carried out with multiple replicates to ensure process consistency and repeatability. The foregoing tests will determine the required heating duration(s) and cooling duration(s) during a heating/cooling cycle(s) to achieve a desired pathogen kill level. The testing will help determine whether a single pasteurization/cooling cycle is sufficient or if more than one heating/cooling cycle will be required.

As part of the testing process, whether any significant change occurs in the raw-like appearance of the food product will also be ascertained. To this end, a color meter will be employed to measure the color of the raw food product before any processing, and thereafter the color of the raw food product can also be measured at the end of the heating step if subsequent cooling of the raw food product does not take place. If cooling of the heated food product does occur, then the color measurements can be taken at the end of the cooling process.

The color meter measures or defines the color variable L, which refers to the level of browning. This variable ranges from 0.0 (black) to 100.0 (white). Using the color meter, the change in the variable L can be measured which represents the browning between the raw food product and the processed food product. Example below sets forth the results of measuring the variable L of raw food products as well as food products that have been heated in accordance with the present disclosure. It is desirable that the change in the variable L not exceed about 5-10% of the color reading for an untreated raw food product. As can be appreciated, the change in the color of the raw food product during processing is also a factor to be considered in designing the heating/cooling cycle(s) of the food product being processed.

The foregoing pasteurization process can be carried out utilizing various systems and apparatus. One such system 100 is illustrated schematically in FIGS. 2-4. Referring to FIG. 3, the pasteurization system 100 includes an infeed conveyor 102 which carries food products 104 from supply source to the pasteurization zone or apparatus 36, whereat the raw food product is rapidly heated to a temperature sufficient to kill a desired level of pathogens on the exterior (or near exterior) of the raw food product. The raw food product 104 is carried through the pasteurization apparatus 36 by conveyor 106 to deliver the pasteurized raw food products to cooling apparatus or zone 110. The food products are carried through the cooling apparatus 110 by a conveyor 112, which can be operated at various speeds to alter the duration that the food products are subjected to cooling. As noted above, in the cooling apparatus, the heat added to the raw food products 104 in the pasteurization apparatus 36 is rapidly removed in the cooling apparatus 110. The conveyor 112 delivers the cooled raw food products to an outfeed conveyor 114 for further processing. Such further processing may consist of repeating the heating and cooling cycle to achieve a higher pathogen kill level on the exterior of the raw food products. As a further alternative, the outfeed conveyor 114 may transport the pasteurized raw food product for other non-pasteurization processing, for example, for evisceration, cutting, portioning, packaging and subsequent refrigeration and distribution.

Describing the foregoing components/aspects of the continuous pasteurization system 100 in more detail, the feed conveyor 102 includes a powered endless belt 120 on which raw food products 104 are loaded for delivery to the pasteurization apparatus 36. Prior to the raw food products 104 being delivered to the pasteurization apparatus 36, the raw food products can be scanned using scanner 122 to ascertain physical characteristics of the raw food products 104 and then scanning information is forwarded to a control system 24. As shown in FIG. 3, the control system 24 includes a processor 31 for use in controlling the pasteurization system 100. The control system also includes a suitable controller, such as a programmable logic controller 124 linked to the processor 31 and having an appropriate interface 126 for connecting the various measuring devices and instruments, monitors, and components of the pasteurization system to the logic controller 124. A memory unit 128 is provided for storing information regarding the pasteurization system and process, and a keyboard or other input device 130 is provided to enable an operator to communicate with the processor and logic controller. Also, a display or other output device 132 is provided to convey information from the processor or control system to the operator, including the functioning of the pasteurization system 100 and method 10. An example of a processor-operated control system for controlling a pasteurization apparatus is disclosed in U.S. Pat. No. 6,410,066, which is incorporated herein by reference. The processor 31 can be connected to a network 134. Also, rather than employing a processor 31 specifically for the control system 24, a network computing system can be used for this purpose instead.

Generally, scanner 122 scans the raw food products 104 to produce scanning information representative of the physical characteristics of the raw food products and forwards this scanning information to the control system 24. The control system 24 analyzes the scanning data to determine the physical characteristics or parameters of the raw food products; for example, its size, shape, length, width, thickness, etc. The control system 24 can also develop a thickness or height distribution of the scanned raw food product. The weight of the raw food product can be determined by using an assumed density for the raw food product.

Prior to being subjected to the pasteurization cycle of the present disclosure, other physical parameters of the raw food products 104 being carried by conveyor 102 may be ascertained. Such parameters may include the surface temperature of the exterior as well as the interior of the food products. In this regard, a temperature measuring apparatus $T_1$ can be employed. Such measuring devices are articles of commerce and can rely on different technologies, such as infrared technology. Alternatively, to measure the interior of the food product, a probe may be inserted into the food product. This can be accomplished utilizing existing apparatus, such as those disclosed by U.S. Patent Publication Nos. 2014/0220197 and 2014/0220193, both of which are incorporated herein by reference. The temperature measurement information is transmitted to the control system 24.

The moisture level on the outer surface of the raw food product can be measured utilizing a moisture meter $M_1$ as the raw food product 104 is being conveyed on the infeed conveyor 102. Moisture meters are articles of commerce, and can use various technologies, such as optical technology. The information from the moisture meter $M_1$ is transmitted to the control system 24.

In addition, the exterior color of the food product, for example, the skin color of poultry, can be measured using the color meter $C_1$, as described above. Information from the color meter $C_1$ is transmitted to the control system 24.

The information from scanner 122, temperature measuring apparatus $T_1$, moisture measuring apparatus $M_1$, and color meter $C_1$ is processed by the control system 24 to determine process parameters for heating and cooling the raw food products 104. Such process parameters may include the length of time that the raw food products are heated within the pasteurization zone or apparatus 36, as well as the temperature and moisture level(s) within the pasteurization zone. The control system 24 also determines the length of time that the raw food product 104 is subjected to cooling in the low temperature zone or apparatus 110. The control system can also calculate the expected log reduction in the pathogen level on the exterior (or near the exterior) of the raw food product 104 based on the pasteurization cycle to which the raw food product is subjected under the present disclosure.

Figure 2:
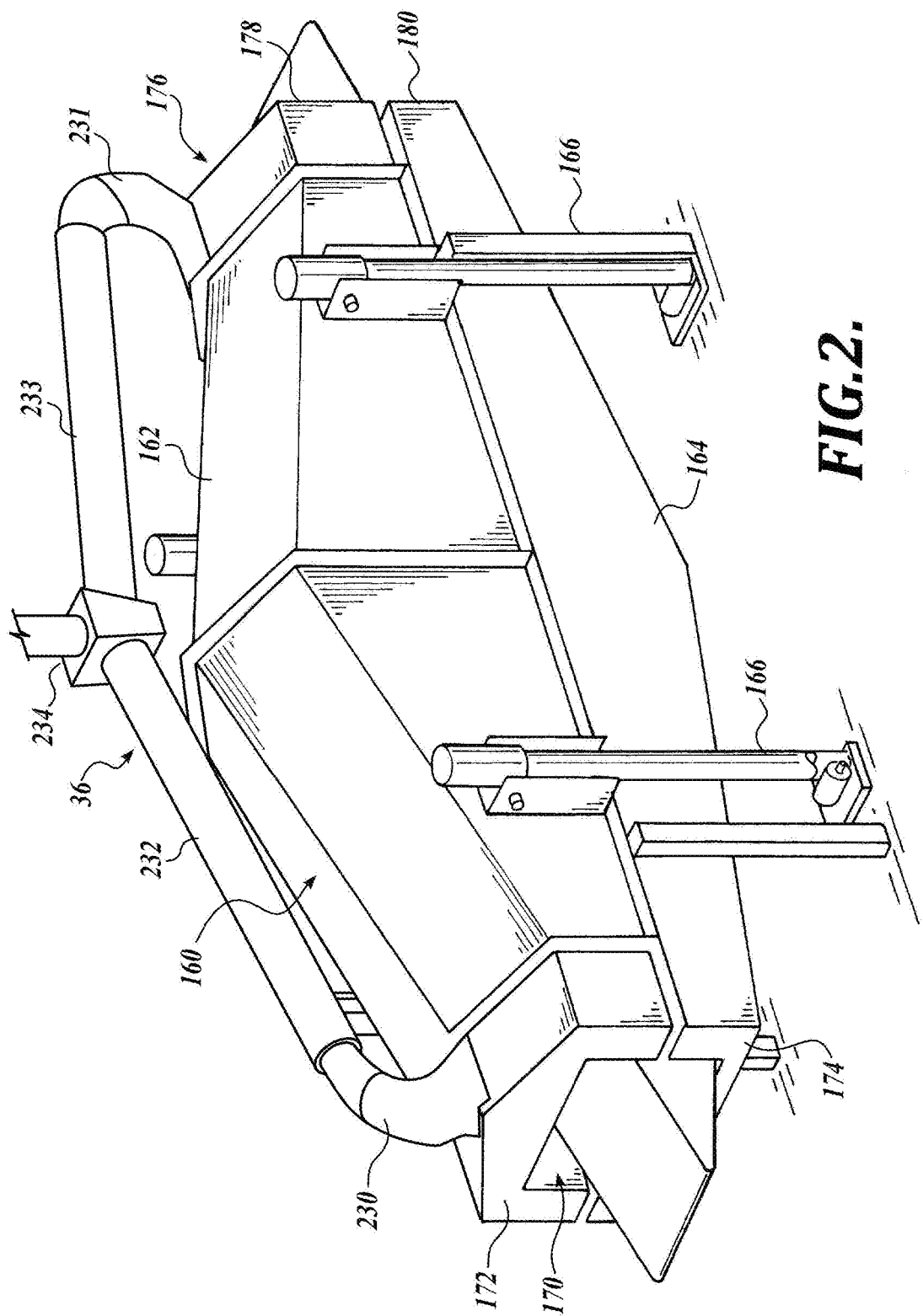
FIG. 2 is a schematic view of a pasteurization chamber for carrying out the method of the present disclosure.
Figure 3:
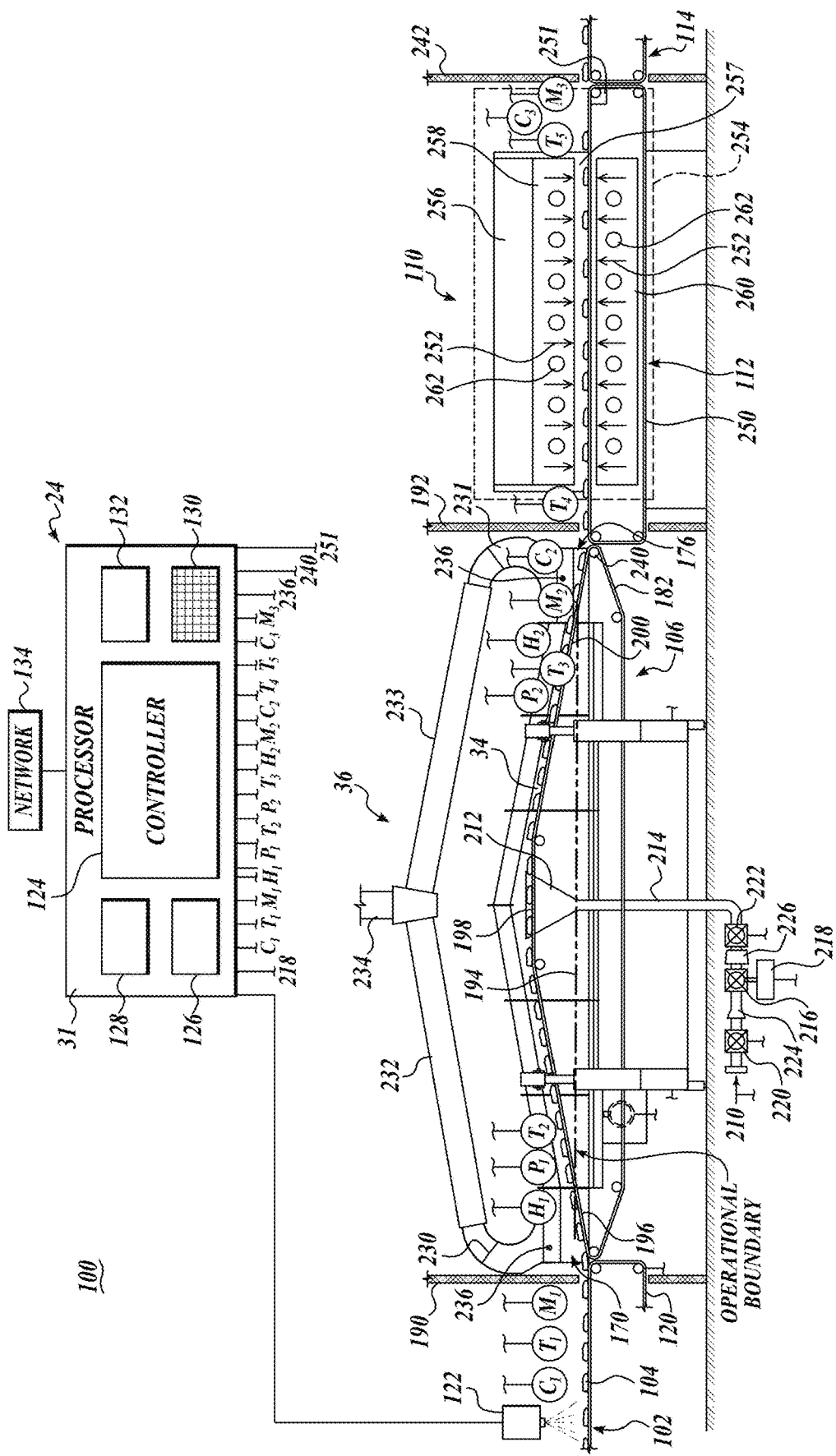
FIG. 3 is an elevational schematic view of the overall system of the present disclosure.
Figure 4:
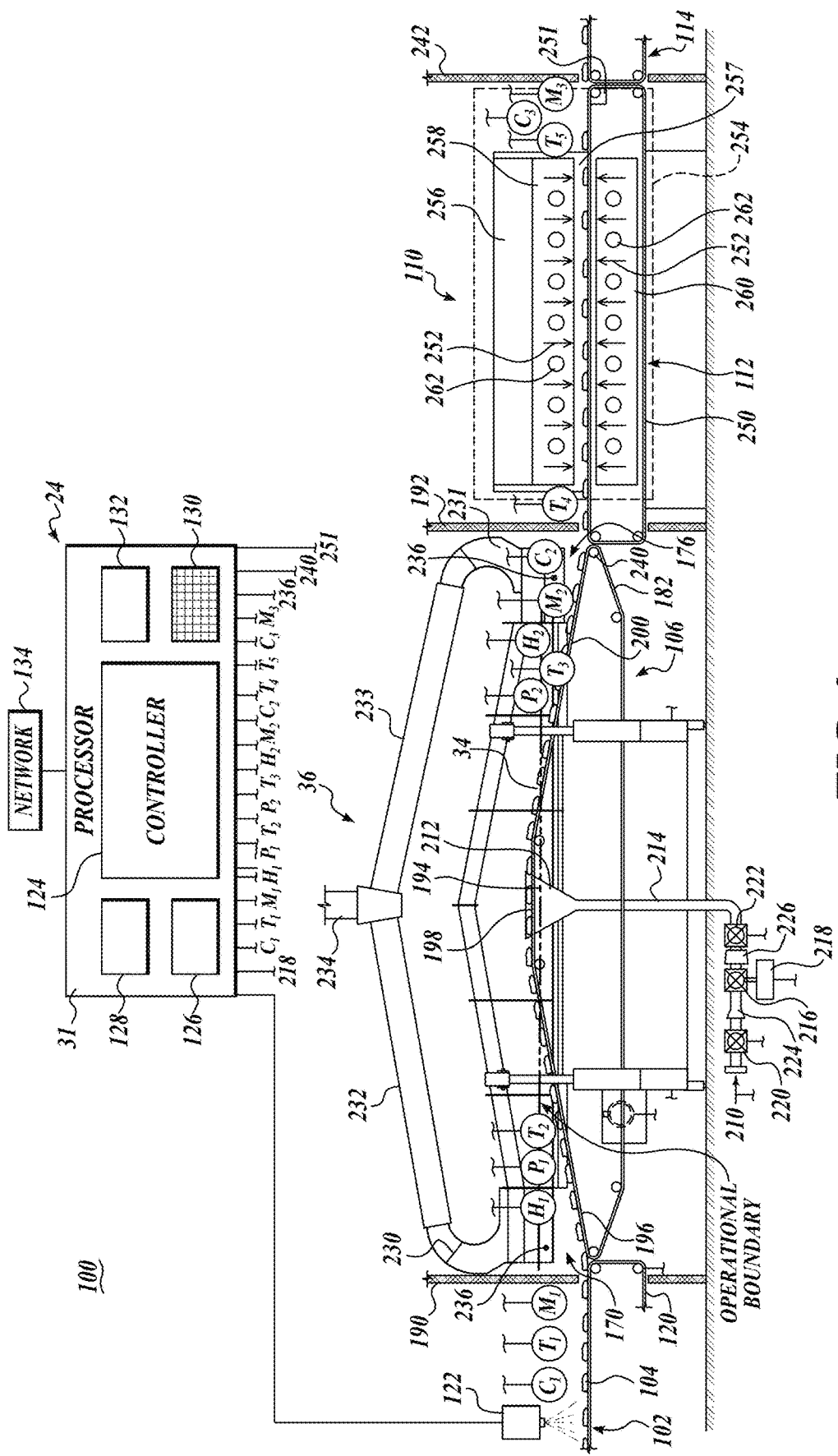
FIG. 4 is an elevational schematic view of the overall system of the present disclosure, showing the system adjusted for reducing the duration of the pasteurization step relative to FIG. 3.

The pasteurization zone or apparatus 36 illustrated in FIGS. 2-4 is constructed similarly to the apparatus 10 and 210 shown in U.S. Pat. No. 5,960,703, incorporated herein by reference. The pasteurization apparatus 36 in basic form includes an enclosure 160 composed of a vertically reciprocal hood 162 and a stationary base section 164. The hood 162 may be raised and lowered by extendable/retractable legs 166 operated electrically, pneumatically, hydraulically, or otherwise. An inlet 170 to the pasteurization apparatus 34 is formed in the end walls 172 and 174 of the hood 162 and base 164, respectively, to which the food products are introduced into the pasteurization chamber 34. Correspondingly, an outlet opening 176 is formed in the end walls 178 and 180 of the hood 162 and base 164, respectively.

The raw food products 104 are transported through the pasteurization apparatus 36 by belt 182 of conveyor 106, having an upper run, the majority of which is disposed within the pasteurization chamber portion 34 of the apparatus 36. As shown in FIG. 3, belt 106 has a lower return run that travels through the base portion 164 of the apparatus 36. The conveyor 106 receives the raw food products 104 from infeed conveyor 102 just inside of a partition wall 190 that separates the pasteurization chamber 34 from the remainder of the plant or facility environment. Preferably the inlet opening 170 is made as small as possible to minimize the egress of the heated cooking medium from the interior of the pasteurization apparatus 36 to the exterior environment.

The conveyor 106 delivers the raw food products 104 from the pasteurization chamber 34 to the cooling apparatus or zone 110 at a location just inside of partition wall 192 located between the downstream end of the pasteurization apparatus 36 and the cooling apparatus 110. The partition wall 192 serves to enclose the pasteurization apparatus 36 from the remainder of the plant or facility and also to separate the pasteurization apparatus from the cooling zone or apparatus 110.

The outlet opening 176 in the apparatus 36 is also made as small as possible to limit the egress of the heated cooking medium from within the pasteurization apparatus. In this regard, the tops of the inlet and outlet openings 170 and 176 essentially define the lower limit 194 of the pasteurization chamber 34, because above these openings there is no, or little, possibility for the escape of the heated cooking medium from within the chamber 34 since the heating/pasteurization medium is of a lower density than ambient air.

As shown in FIGS. 3 and 4, the upper run of the belt 182 of conveyor 106 has a first section 196 that extends from inlet opening 170 upwardly into the pasteurization atmosphere of the pasteurization chamber 34, a horizontal second belt section 198, which is disposed entirely within the pasteurization chamber 34, and a third section 200 which descends downwardly from the pasteurization chamber 34 to the outlet opening 176. The horizontal middle or second belt section 198 can be omitted, in which case the third or descending belt section 200 of the upper run of the conveyor belt 182 follows immediately after the first or ascending section 196.

As also shown in FIGS. 3 and 4, a portion of the belt section 196, including the end of the belt adjacent infeed conveyor 102, is at an elevation below the lower limit or boundary 194 of the pasteurization chamber 34. The food products 104 are introduced onto the belt 182 in this region to pass into the pasteurization apparatus 36, to then rise into the pasteurization chamber 34 once above the lower limit or boundary 194 of the pasteurization chamber. From this point on, the raw food product is within the envelope of the pasteurization chamber 34 until the raw food product on belt third section 200 descends below the lower limit or boundary 194 of the pasteurization chamber 34 at the downstream end of the pasteurization apparatus 36 just prior to entry into the cooling zone or apparatus 110.

As discussed above, it is desirable to create a very high humidity, droplet-free, saturated steam atmosphere within the pasteurization chamber 34. In this regard, the steam chamber is at, or approaches, 100% humidity at a temperature of approximately 212° F. under atmospheric conditions. These operating parameters for the pasteurization chamber 34 enable the exterior heating in the raw food products 104 to occur as quickly as possible to not only preserve the raw nature of the food products, but also to maximize product throughput, and also minimize moisture loss in the raw food product. Also, saturated steam with the foregoing parameters has a lower density than air, which causes the steam to be maintained within the enclosure 166 above the level of the inlet and outlet openings 170 and 176. As such, the pasteurization chamber 34 is maintained substantially filled with steam medium.

Referring specifically to FIG. 3, a source of steam under pressure, shown at 210, supplies steam to steam inlets 212, located centrally on each side of the pasteurization chamber 34, which distribute the steam within the upper region of the hood 162. The steam inlets 212 are shown as generally triangular (fan-shaped) plenums, which extend longitudinally and are mounted centrally relative to the hood 162. Each plenum has a lower apex at which the plenum is connected to a steam supply conduit 214. The configuration of plenums of the stem inlets 212 enable the steam to be introduced into the pasteurization chamber 34 to first disburse within the plenum prior to discharge into the pasteurization chamber. This helps reduce the velocity of the steam therein. The discharge of steam in the upper portion of the pasteurization chamber 34, and above the second or middle section 198 of the conveyor belt 182, helps distribute the steam evenly throughout the pasteurization chamber 34.

The moisture level within the pasteurization chamber is maintained by injecting saturated steam into the cooking atmosphere in order to substantially fill the pasteurization chamber with 100% saturated steam. As a result, the highest possible moisture level is maintained within the pasteurization chamber with a minimum amount of steam required. To this end, the exit velocity of the steam from plenums 212 may be less than 1000 feet per minute, and about 800 feet per minute, thereby to provide steam input that minimizes turbulence in the introduced steam. The reduced turbulence helps facilitate the creation of a desired 100% saturated steam environment within the pasteurization chamber 34.

Still referring specifically to FIG. 3, steam from source 212 flows through a regulator or control valve 216 that is controlled by a sensor or transducer 218 which senses the temperature of the steam in the conduit 214 and controls the flow of the steam through the conduit 214. Valves 220 and 222, as well as flow reducers 224 and 226, are positioned upstream and downstream of the valve 216.

Exhaust elbows 230 and 231 are positioned above the inlet and outlet openings 170 and 176, respectively, with pasteurization apparatus 36 to collect the small amounts of steam escaping from the pasteurization chamber 34. The elbows 230 and 231 function as discharge Coanda's. The elbows 230 and 231 connect to exhaust pipes 232 and 233, which lead to an exhaust stack 234. Steam sensors 236 are provided at or near the elbows 230 and 231 so as to sense the amount of steam loss from the pasteurization chamber 34. The output signals from steam sensors 236 are routed to control system 24, and that information can be used to control the rate of steam into the pasteurization chamber 34 by operation of the transducer 218 and valve 216 described above. As such, it is possible to maintain the level of steam or steam density within hood 162 substantially constant regardless of the product flow level through the pasteurization apparatus 36.

As shown in FIGS. 3 and 4, the outlet 176 of the pasteurization apparatus is at a lower elevation than the inlet 170. Correspondingly the inlet to discharge elbow 231 at the outlet end of the pasteurization apparatus 36 is at a lower elevation relative to the elevation of the inlet elbow 230 at the inlet end of the pasteurization apparatus 36. Positioning the outlet 176 lower than the inlet 170 and correspondingly positioning the discharge elbow 231 lower relative to elbow 230 will cause the steam leakage in the apparatus 36 to favor the elbow 230, such that the steam loss at the discharge end of the apparatus 36 is lower in flow. As a result, the lower flow vent path at the discharge end of the pasteurization chamber will keep the condensation levels lower where the cold air from the cooling apparatus 110 could otherwise cause large amounts of condensation, and also resulting in a higher probability of contamination downstream due to splashes. Also, the relative positions of the discharge elbows 231 and 230 help reduce moisture being transferred with the raw food product as the raw food product enters the cooling apparatus, thereby to more effectively control or reduce frost buildup on the belt and the cooling coils of the cooling apparatus 110.

Also, the exhaust flowing through elbow 230 and its corresponding pipe 232 can be controlled independently relative to elbow 231 and its corresponding pipe 233. Also, each exhaust route can be individually controlled by a damper operated with variables frequency motor drives in a standard manner, thereby to control and potentially reduce steam/heating median leakage to the atmosphere.

As discussed above, the raw food product is heated in the pasteurization chamber 34 for a brief period of time, for example, in the range of about 15 seconds to about seconds. The time period for the pasteurization step can be adjusted by raising and lowering the hood 162 relative to the base 164. As shown in FIG. 4, when the hood 162 is raised, the lower boundary level 194 of the pasteurization chamber 34 rises relative to the belt 182 of conveyor 106. As such, raw food product 104 being carried on the belt 182 is within the pasteurization chamber 34 for a shorter period of time than when the hood 162 is in a lower position, as shown in FIG. 3. As such, the length of exposure time of the raw food product to the pasteurization chamber 34 can be altered conveniently by simply raising and lowering the hood 162 relative to base 164.

As an alternative to, or in conjunction with, the raising and the lowering of the hood 162, the time duration that the raw food products 104 are exposed to the pasteurization chamber 34 can be altered by changing the speed of the belt 182. To this end, the speed of the drive motor 240 of the belt 182 can be controlled by control system 24 in a well-known manner.

In addition to steam sensors 236, various other measuring instruments or devices can be utilized to monitor the operation of the pasteurization apparatus 34 as well as the condition of the food product being treated in the pasteurization apparatus. To this end, temperature measuring devices T 2 and T 3 may be located within the pasteurization chamber 34 to monitor the temperature therein. Also, the humidity measuring devices $H_1$ and H 2 may be located within the pasteurization chamber 34 to monitor the humidity of the heating medium therein, to confirm that the heating medium is at a fully saturated level, or close to a fully saturated level. Further, the pressure within the pasteurization chamber 34 can be measured by pressure gages $P_1$ and $P_2$ to confirm that the pressure therein is in a desired range, for example, neutral to slightly positive relative to respective room pressures. This can be controlled by adjusting the 5 to 20 psi steam supply pressure. As noted above, temperature measuring devices such as $T_2$ and $T_3$ are articles of commerce. Further, humidity measuring devices such as $H_1$ and $H_2$, as well as pressure measuring devices such as $P_1$ and $P_2$, are also articles of commerce.

The signals from $T_2$ and $T_3$, $H_1$, $H_2$, $P_1$ and $P_2$ are transmitted to control system 24. If the measured parameters are not within the desired set points or are trending toward a level beyond the desired set point interval, the control system controller 124 can operate or change various operational parameters of the pasteurization apparatus 36, including, for example, the height of the pasteurization chamber hood 162 relative to base 164, thereby to alter the time period of pasteurization treatment. Alternatively or in addition, the speed of the conveyor 102 may be controlled to alter the time duration of the pasteurization treatment of the raw food products 104. Further, the volume, pressure and saturation level of the steam medium in the pasteurization chamber can be controlled by the controller 124.

The physical parameters of the raw food product 104 at the end of the pasteurization process can be ascertained including measuring the exterior as well as the interior temperature of the food product using temperature measuring device $T_4$. If required, separate temperature measuring devices may be employed to measure the exterior surface temperature of the food product and the interior temperature of the food product. A moisture measuring device $M_2$ may be used to measure the level of moisture on the exterior of the food product. Further, a color meter $C_2$ may be used to measure the exterior color of the raw food product 104. The measurement signals from $T_4$, $M_2$ and $C_2$ are transmitted to the control system 24 to determine and/or verify that the pasteurized raw food product 104 has been sufficiently heated to kill a desired level of pathogens on the raw food product. Further, the color meter determines whether or not any appreciable change in the exterior color of the raw food product has occurred, and if so, to what extent. This information plus the information from the moisture and temperature meters can be used to determine whether or not the operational settings of the cooling apparatus 110 are satisfactory or need to be altered. Moreover, this information is useful in determining whether or not a further pasteurization cycle is required to achieve the desired kill level of the pathogens on the food products 104.

As shown in FIG. 3, conveyor 106 transports the pasteurized raw food products 104 through the pasteurization apparatus 36, then through outlet opening 176, to deliver the pasteurized raw food products to the conveyor 112 of the cooling zone/apparatus 110. As discussed above, a partition wall 192 exists between the location of the pasteurization apparatus 36 and the cooling zone/apparatus 110 to separate these portions of the pasteurization system 10 into separate physical spaces, thereby to help reduce any transference of the heated pasteurization medium to the cooling apparatus 110 and likewise the cooling medium utilized in the apparatus 110 to the apparatus 36. An appropriate opening is provided in the wall 192 to accommodate conveyors 106 and/or 112.

A partition wall 242 is also located at the downstream end of the cooling apparatus 110. The wall 242, together with wall 192, helps to isolate the cooling apparatus 110 from the remainder of the facility or structure in which the system 100 is located. As such, there is a greater likelihood that the desired operating parameters of the cooling apparatus 110 will be maintained.

The cooling apparatus 110 is illustrated as an impingement type cooler which directs very cold air at high speeds to the top and bottom surfaces of the raw food products 104 being carried on the conveyor 112. The conveyor 112 is constructed with an open mesh-type conveyor belt 250, which allows the impingement air represented by arrows 252 to be directed to the upper and lower surfaces of the food products 104 and also blow through the conveyor belt 250.

The cooling apparatus 110 is schematically depicted as including a housing 254 to encase an evaporator 256 positioned in an upper portion of the housing. The evaporator 256 can be cooled using an appropriate cooling fluid, such as ammonia, through appropriate inlet and outlet piping to and from the evaporator. Fans, not shown, are used to draw the refrigerated air from the evaporator through one or more manifolds 257 extending downwardly to an upper plenum 258 and a lower plenum 260. Openings 262 are formed in the upper and lower plenum 258 and 260 to allow the cold air to enter the plenum. Air outlets are disposed along the lower surface of the upper plenum 258 and the upper surface of the lower plenum 260 to direct the cold air to the upper and lower surfaces of the raw food product 104 being carried along the upper run of the conveyor belt 250.

As noted above, the cooling apparatus 110 is configured to rapidly remove the heat applied to the raw food product by the pasteurizing apparatus 36. To this end, the cooling apparatus 110 is operated at low temperature, in the range of about −20 to −60° F., and the impingement air is directed to the food products at a velocity in the range of about 500 to 3500 feet per minute. Under these conditions, the food product does not require exposure to the impingement air for a very long duration. A duration of about 30 seconds may be sufficient. Depending on the quantity of heat applied to the food product by the pasteurization apparatus 36, the length of time that the food product needs to be subjected to the cooling apparatus 110 may be for even shorter time periods, for example, 25 seconds, or as a further example, 20 seconds, or as a further example, 15 seconds. By the time the raw food product 104 exits the cooling apparatus 110, the temperature of the raw food product desirably has been lowered to about the temperature of the raw food product before entering the pasteurization apparatus 36, or even to a lower temperature.

The temperature of the raw food product 104 exiting the cooling apparatus 110 can be measured via temperature measuring apparatus $T_5$. The moisture on the exterior surface of the food product may be measured by a moisture meter $M_3$. In addition, the color of the exterior of the food product exiting the cooling apparatus 110 may be measured by color meter $C_3$. The information from the temperature measuring apparatus $T_5$, the moisture measuring apparatus $M_3$, and the color meter $C_3$, is transmitted to the control system 25 to verify that these parameters are at the expected level at the completion of the pasteurization process. Moreover, this information may be used to help set the parameters for further heating and cooling if a second or subsequent pasteurization cycle is required. In such second or subsequent cycle, the time periods that the food product is subjected to the pasteurization chamber 34 and/or the cooling apparatus 110 may be different than the time period for the heating and cooling treatment of the food product during the initial or prior pasteurization cycle.

Conveyor 112 delivers the cooled raw food products 104 to an outlet or takeaway conveyor 114. The takeaway conveyor is used to transfer the raw food product for further processing, whether for another pasteurization cycle, or to an evisceration, cutting, portioning, or packaging station, or to a freezer, etc.

One advantage of using an impingement type cooling apparatus is that the high-speed impingement air "breaks apart" or "washes away" the boundary layer of air on the raw food product surfaces. Typically, this boundary layer is static and acts as an insulator to slow down the rate of heat transfer from the raw food product surface. However, by introducing the refrigerated air at high velocity relatively close to the surface of the raw food product, the boundary layer is "pushed away." As a consequence, the transfer of heat from the surface of the raw food product 104 can occur relatively rapidly in comparison with use of a conventional mechanical freezer with air flows delivered in one direction.

Nonetheless, an alternative to an impingement cooler is a cryogenic freezer utilizing liquid nitrogen as a cooling medium. Cryogenic freezers are capable of achieving temperatures at least as low as −300° F. Exposing the heated raw food product 104 to this low of a temperature would result in the rapid removal of heat energy applied to the raw food product 104 by the pasteurization apparatus 36.

The example of the present method set forth below is directed at raw food products in the form of chicken drumsticks. However, it is to be understood that the present process and system can be employed for whole food products or partially portioned or cut food products, as well as whole food products, such as poultry, prior to or after evisceration. Moreover, the present method and system is applicable to a wide range of food products beyond meat, poultry and fish, including fruits, vegetables, legumes and nuts.

Also, the belt type conveyors 102, 106, 112 and 114 may be replaced with other types of conveyors, such as an overhead cable conveyor to which shackles or hooks are attached for suspending the raw food product therefrom, for example, whole chickens or turkeys. It will be understood that the openings 170 and 176 of the pasteurization apparatus 36 may be sized in accordance with the size of the raw food product being processed by the continuous pasteurization system 100 of the present disclosure. Likewise the size of the openings to and from the cooling apparatus 110 may also be sized in relation to the size of the raw food product being processed.

As a further variation, the conveyors 102, 106, 112 and 114 may be of various widths so that the raw food product may be located on the conveyors in dual lanes, triple lanes, or even a larger number of lanes. Use of multiple product lanes will increase the throughput achieved by process 10 and pasteurization system 100.

The upstream processing of the raw food product 104, for example, the defeathering of poultry, may result in a significant amount of moisture on the exterior of the raw food products. To accommodate such moisture, a blower system may be utilized to reduce the moisture level on the exterior of the raw food product prior to entry into the pasteurization apparatus. In conjunction or as an alternative to the blower system, the set point parameters of the pasteurization apparatus may be altered to accommodate the moisture level on the raw food product entering the apparatus. For example, if there is appreciable moisture on the exterior of the raw food product, the operating temperature of the pasteurization chamber 34 may be increased, for example by about 5° F., to accommodate the moisture on the surface of the raw food product.

To help seal the interior of the pasteurization apparatus 36 from the exterior as well as the cooling apparatus 110 from the exterior, appropriate sealing mechanisms can be utilized. Such sealing mechanisms may include, for example, steam or air knives used at the inlet and outlet openings 170 and 176 of the pasteurization apparatus 36. Correspondingly, air knives can be utilized at the inlet and outlet openings to the cooling apparatus 110. The construction and operation of such steam and air knives is well known. Of course, other types of sealing mechanisms may be utilized, for example, curtains or flexible strips constructed of a film material such as fabric or plastic, that hangs downwardly over the inlets and outlets to the pasteurization apparatus 36 and cooling apparatus 110. Such film material is sufficiently flexible to conform to the shapes of the raw food products 104 being carried by the conveyors. Of course, the plastic/fabric strip curtain construction may require periodic cleaning to help ensure that undesirable microorganisms do not lodge on the plastic or fabric hanging strips.

Belt washer systems may be employed with conveyors 106 and 112, as well as other conveyors of the system 100. Such belt washers are in use in existing food processing systems. In the present situation it is important that the belt washer leave the conveyor belts in a clean and substantially dry condition so as not to alter the pasteurization process within chamber 34 or the cooling process in cooling apparatus 110.

Example

Figure 5A:
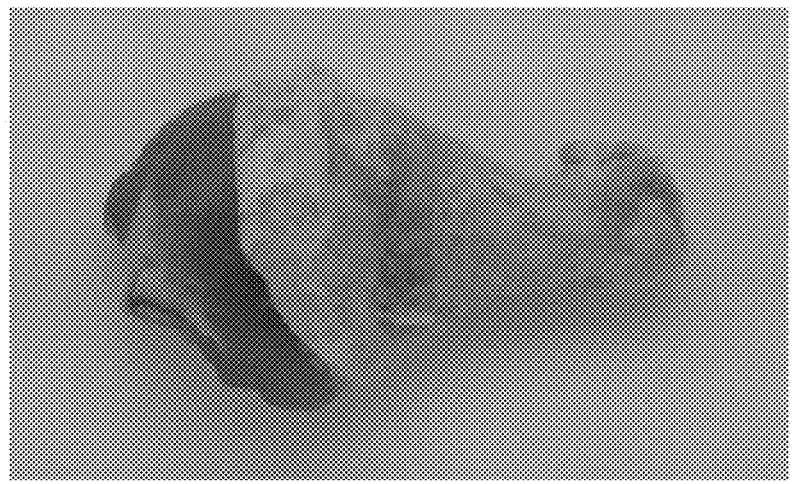
FIGS. 5A to 5G are photographs of food products in unpasteurized state as well as after pasteurization alone or after pasteurization and then cooling, using the method and system of the present disclosure.
Figure 5B:
Figure 5C:
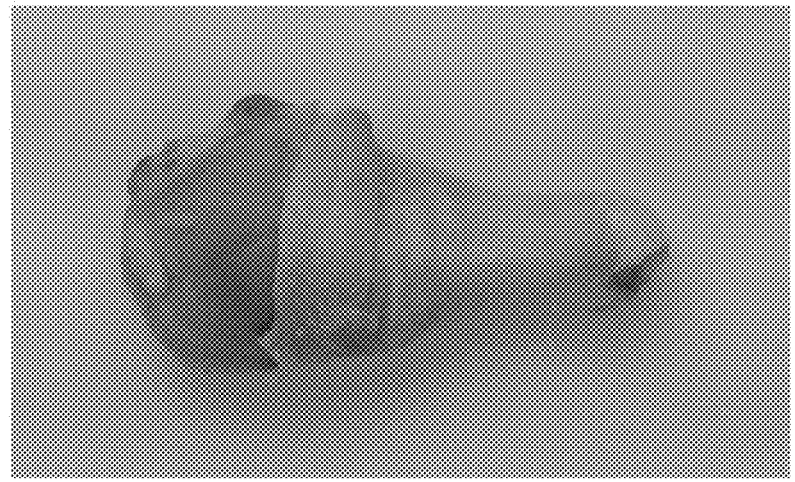
Figure 5D:
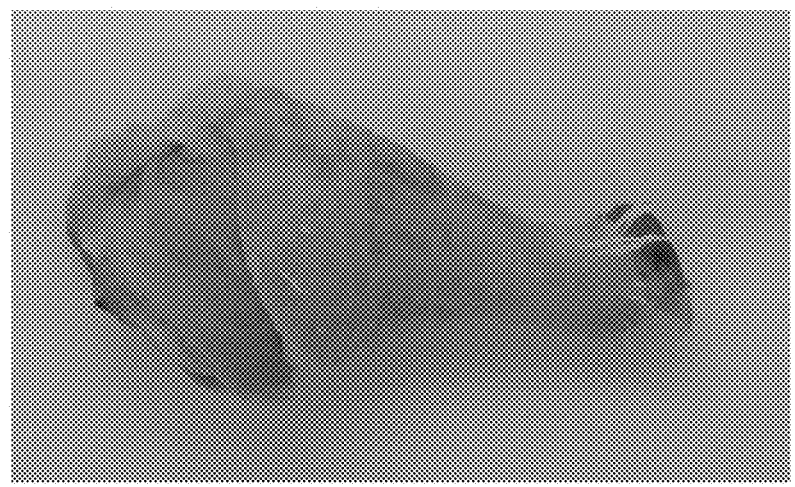
Figure 5E:
Figure 5F:
Figure 5G:
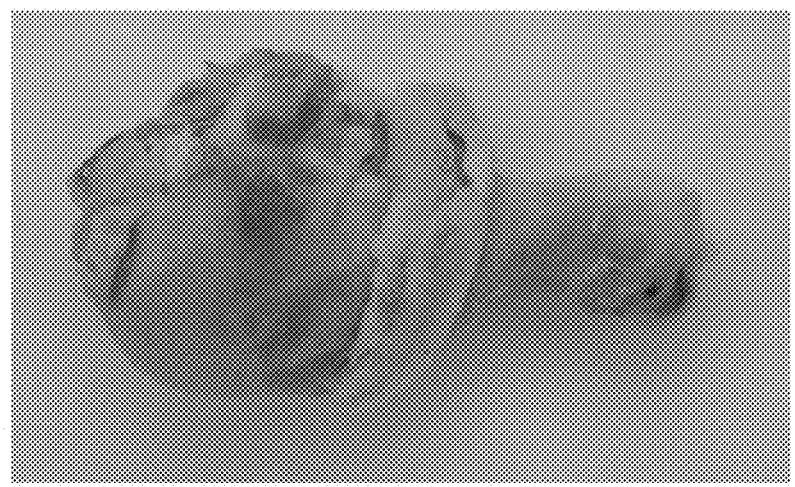

The effect of the rapid heating of the exterior of food products in accordance with the present disclosure and the subsequent rapid cooling of the food products on the change of the exterior color of the food product was tested. The test was carried out on chicken drumsticks. FIG. 5A illustrates a sample raw chicken drumstick as used in the testing performed. In the testing the color parameter/variable L was measured. This parameter/variable pertains to the lightness or darkness of the subject being measured, with the darkest black having a zero value and the brightest white having a 100 value. The parameter L was measured using a commercially available colorimeter, MiniScan® XE, Model Number 45/O-L.

As set forth in Table 1 below, measurements were taken for the following: Process Raw (raw food products (drumsticks)), Process A1 (food products heated for 10 seconds in 208° F. saturated steam); Process A2 (food products heated for 10 seconds in 208° F. saturated steam for and then chilled for 15 seconds at −40° F.; Process B1 (food products heated for 20 second with 208° F. saturated steam; Process B2 (food products heated for 20 second with 208° F. saturated steam and then chilled for 20 seconds at −40° F.; Process C1 (food products heated for 30 second with 208° F. saturated steam; and Process C2 (food products heated for 30 seconds with 208° F. saturated steam and then chilled for 25 seconds at −40° F.).

For each of the processes five sample readings were taken at visually different sections of the skin of the food pieces having a generally similar appearance. The five color readings for each process is set forth below in Table 1. Table 1 also provides the average L parameter reading as well as the standard deviation of the five readings for each of the processes. The color of the food products corresponding to the processes set for the above are illustrated in FIGS. 5A-5G.

Table 2 below sets forth the average surface color variation for each process relative to the average value for the raw food product. A positive number in Table 2 indicates that the average L reading was lighter than the average L reading for the raw food product, whereas a negative number indicates that the average color reading was a particular percentage darker than the average reading for the raw food product. Table 2 indicates that in the worst case sample (C2), the average color of the food product heated for 30 seconds in 208° F. saturated steam and then immediately cooled for 25 seconds with −40° F. impingement air flowing at 3000 feet per minute, was still within 5% of the average color reading of the raw food product.

The foregoing, or similar, procedure can be performed on sample food products prior to processing so as to determine both the level of pathogenic kill level achieved through biological studies as well as the corresponding change in the color of the exterior of the food product. This information enables the user to determine what time duration is required for an acceptable pathogenic kill level to be achieved and the resulting effect on the exterior color of the food product. In this regard, a limit can be set on the acceptable color change in the food product, with the acceptable color change corresponding to maintaining the raw state of the food product.

It is expected that at the maximum acceptable color change in the food product, an acceptable reduction in the level of pathogens on the food product will have been achieved.

TABLE 1

| Process: Raw | |
| --- | --- |
| Sample # | L/σ |
| 1 | 7.85 |
| 2 | 4.22 |
| 3 | 10.20 |
| 4 | 10.41 |
| 5 | 8.32 |
| Average | 8.20/2.23 |
| Process A1: 10 Seconds in steam | |
| Sample # | L/σ |
| 1 | 4.83 |
| 2 | 6.95 |
| 3 | 7.11 |
| 4 | 1.99 |
| 5 | 5.58 |
| Average | 5.29/1.85 |
| Process A2: 10 Seconds steam/15 seconds Chill | |
| Sample # | L/σ |
| 1 | 5.69 |
| 2 | 10.73 |
| 3 | 11.76 |
| 4 | 12.18 |
| 5 | 12.37 |
| Average | 10.55/2.49 |
| Process B1: 20 Seconds steam | |
| Sample # | L/σ |
| 1 | 3.04 |
| 2 | 3.92 |
| 3 | 9.38 |
| 4 | 4.28 |
| 5 | 9.31 |
| Average | 6.00/2.77 |

TABLE 1-continued

| Process B2: 20 Seconds steam/20 seconds Chill | |
| --- | --- |
| Sample # | L/σ |
| 1 | 4.32 |
| 2 | 9.09 |
| 3 | 10.33 |
| 4 | 8.03 |
| 5 | 8.21 |
| Average | 8.00/2.01 |

| Process C1: 30 Seconds steam | |
| --- | --- |
| Sample # | L/σ |
| 1 | 7.29 |
| 2 | 13.10 |
| 3 | 7.31 |
| 4 | 5.54 |
| 5 | 11.88 |
| Average | 9.02/2.92 |

| Process C2: 30 Seconds steam/25 seconds Chill | |
| --- | --- |
| Sample # | L/σ |
| 1 | 13.85 |
| 2 | 14.98 |
| 3 | 9.72 |
| 4 | 14.38 |
| 5 | 10.94 |
| Average | 12.77/2.06 |

TABLE 2

| Process | Delta L |
| --- | --- |
| A1 | 2.91 |
| A2 | −2.35 |
| B1 | 2.20 |
| B2 | 0.20 |
| C1 | −0.82 |
| C2 | −4.57 |

While illustrative embodiments have been illustrated and described, it will be appreciated that various changes can be made therein without departing from the spirit and scope of the invention.

The embodiments of the invention in which an exclusive property or privilege is claimed are defined as follows:

1. A control system for controlling a pasteurization system for continuously pasteurizing raw food products to kill a desired percentage of pathogens located on, as well as optionally near, the surface of the raw food products while substantially maintaining the raw state of the raw food products, the control system comprising:
   (a) a function to control a conveyance system to convey the raw food product through the pasteurization system;
   (b) a function to control a pasteurization apparatus comprising a pasteurization chamber within which is created an elevated temperature sufficient to kill pathogens on or near the surface of the raw food products by at least 1 LOG within at least seconds;
   (c) a function to control a cooling apparatus to receive the pasteurized raw food product from the pasteurization apparatus, the cooling apparatus comprising a cooling chamber within which is created a cooling environment for rapidly cooling the raw food product to remove the heat energy applied to the raw food product during the heating process and thereby maintaining the substantially raw state of the raw food product;
   (d) a function to control a temperature measuring system to measure the temperature of the raw food product at one or more locations along the pasteurization system selected from the group consisting of: prior to entrance into the pasteurization chamber; within the pasteurization chamber, within the cooling chamber; and after exiting the cooling chamber;
   (e) a function to control the temperature measuring system to also measure the temperature within the pasteurization chamber and optionally within the cooling chamber; and
   (f) the control system receiving the temperature measurements from the temperature measuring system, controlling the speed of the conveyance system as well as the parameters of the pasteurization apparatus and cooling apparatus to achieve a desired elevated temperature on the exterior surface of the raw food product within the pasteurization chamber within at least 30 seconds and then immediately cooling the exterior of the raw food product in the cooling chamber within a sufficiently short time period to not appreciably change the raw state of the raw food product, wherein the raw state of the food product selected from the group consisting of avoiding: denaturing the protein of the raw food product including on the surface of the raw food product; changing the color of the raw food product; rendering the fat of the raw food product.

2. The control system according to claim 1, further comprising a function to control the pasteurization apparatus to receive saturated steam from a saturated steam source.

3. The control system according to claim 1, further comprising a function to control the cooling apparatus to direct impingement air at a temperature of about from −20° Fahrenheit to −60° Fahrenheit at the raw food product at a velocity of from about 500 to about 3500 feet per minute.

4. The control system according to claim 1, comprising a function to control the pasteurization system so that if a desired pathogen-kill percentage has not been reached, repeating the pasteurization step and the cooling step until a desired pathogen-kill percentage is achieved without denaturing the protein of the raw food products.

5. The control system according to claim 4, wherein in repeating the pasteurization step, the control system exposing the raw food products to a pasteurization zone for a maximum time duration that differs from the prior exposure duration of the raw food products to the pasteurization zone.

6. The control system according to claim 4, wherein in repeating the cooling step following the repeated pasteurization step, the control system exposing the raw food products to the low temperature zone for a maximum duration that differs from the prior exposure duration of the raw food products to the low temperature zone.

7. The control system according to claim 1, further comprising a function of controlling the surface temperature of the raw food products to a level below the dew point temperature of the enclosure upon entry of the raw food products to the pasteurization zone.

8. The control system according to claim 1, further comprising:
   a function to ascertain the physical parameters of the raw food products prior to entry into the pasteurization zone to predetermine a pasteurization and cooling cycle for the raw food products;
   a function to expose the raw food products to the pasteurization zone at predetermined set point parameters for a predetermined time period based on the ascertained physical parameters of the raw food products; and a function to thereafter immediately expose the raw food products to the cooling zone at predetermined set point parameters for a predetermined time length based on the ascertained physical parameters of the raw food products to rapidly remove the heat energy gained by the raw food products in the pasteurization zone.

9. The control system according to claim 8, wherein the physical parameters of the raw food products are ascertained prior to entry into the pasteurization zone comprising one or more physical parameters selected from the group consisting of:

the type of the raw food products;
the core temperature of the raw food products;
the surface temperature of the raw food products;
the water activity of the raw food products;
the moisture level on the outer surface of the raw food products; and
the color of the exterior of the raw food products.

10. The control system according to claim 1, further comprising a function to determine the kill level achieved with respect to targeted pathogen(s) based on the measured temperature of the raw food products at the end of the exposure to the pasteurization zone.

* * * * *